United States Patent [19]

Yamamoto et al.

[11] Patent Number: 4,806,778
[45] Date of Patent: * Feb. 21, 1989

[54] MICRO-DISPLACEMENT MEASURING APPARATUS USING A SEMICONDUCTOR LASER

[75] Inventors: Osamu Yamamoto, Nara; Hiroshi Hayashi, Kyoto; Sadayoshi Matsui, Tenri; Haruhisa Takiguchi, Nara; Nobuyuki Miyauchi, Tenri, all of Japan

[73] Assignee: Sharp Kabushiki Kaisha, Osaka, Japan

[*] Notice: The portion of the term of this patent subsequent to Apr. 7, 2004 has been disclaimed.

[21] Appl. No.: 832,885

[22] Filed: Feb. 26, 1986

[30] Foreign Application Priority Data

Feb. 28, 1985 [JP] Japan .................................. 60-41754

[51] Int. Cl.$^4$ ............................................. G01B 11/00
[52] U.S. Cl. ........................................ 250/561; 356/4; 356/373
[58] Field of Search .................... 250/550, 561; 356/4, 356/5, 373, 375; 372/92

[56] References Cited

U.S. PATENT DOCUMENTS 3,409,370 11/1968 King et al. .............................. 356/51
4,655,597 4/1987 Yamamoto et al. ................. 356/373

FOREIGN PATENT DOCUMENTS 0077659 7/1978 Japan ....................................... 356/4
0047902 3/1985 Japan ....................................... 356/5
1038140 8/1966 United Kingdom .

OTHER PUBLICATIONS

Pankove et al., "High Precision Distance Measuring Laser", RCA Technical Note #918, Oct. 25, 1972.
Dandrige et al., "Diode Laser Sensor", Electronics Letters, vol. 16, No. 25, Dec. 4, 80.

Primary Examiner—Edward P. Westin
Attorney, Agent, or Firm—Birch, Stewart, Kolasch & Birch

[57] ABSTRACT

A micro-displacement measuring apparatus using a semiconductor laser, comprises a compound resonator system containing the semiconductor laser, and a light detector receiving a light from said semiconductor laser. The compound resonator system is constructed such that a light from the semiconductor laser irradiates an object to be measured and the reflected light therefrom returns to the semiconductor laser, wherein the relationship between the reflectivity $R_f$ at the front facet of the semiconductor laser from which a laser light irradiates the object, and the reflectivity $R_r$ at the ear facet of the semiconductor laser which is opposite the front facet is as follws: $0.1\, _RfRr<1$.

4 Claims, 2 Drawing Sheets

MICRO-DISPLACEMENT MEASURING APPARATUS USING A SEMICONDUCTOR LASER

BACKGROUND OF THE INVENTION

1. Field of the invention

This invention relates to a micro-displacement measuring apparatus which can attain accurate and ready measurement of micro-amounts and the direction of displacement of objects.

2. Description of the prior art

As measuring methods for measuring the amount of displacement of an object to be measured, there have been (1) a method using dial gauges; (2) a method using optical levers; (3) a method using variation of the capacity of condensers; (4) a method using differential transformers; and (5) a method using optical interference, etc. However, methods (1) and (2) are disadvantageous in that the micro-displacement of the object cannot be measured. Methods (1), (3) and (4) are also disadvantageous in that measuring probes must be connected to the object. Method (3) is also inferior in that a linear relationship cannot be attained between the variation of the capacity of the condensers and the micro-displacement of the object. Method (5) is inferior in that since the movement of the interference pattern must be observed to detect the direction of displacement of the object, the direction thereof cannot be readily detected.

SUMMARY OF THE INVENTION

The micro-displacement measuring apparatus of this invention overcomes the above-discussed and numerous other disadvantages and deficiencies of the prior art, comprises a compound resonator system containing a semiconductor laser, and a light detector receiving a light from said semiconductor laser; said compound resonator system being constructed such that a light from said semiconductor laser irradiates the object to be measured and the reflected light therefrom returns to said semiconductor laser, wherein the relationship between the reflectivity $R_f$ at the front facet of said semiconductor laser from which a laser light irradiates said object, and the reflectivity $Rr$ at the rear facet of said semiconductor laser which is opposite the front facet is as follows:

$$0.1 < R_f Rr < 1$$

The semiconductor laser has, in a preferred embodiment, an internal-cavity length of 250 μm or more.

The compound resonator system comprises, in a preferred embodiment, a semiconductor laser, a collimator lens for producing a beam of parallel rays of light from said semiconductor laser, and a beam splitter for dividing the parallel rays of light into two elements at right angles to each other, one of which is directed to said object and the other of which is directed to said light detector.

An alternative compound resonator system comprises, in a preferred embodiment, a semiconductor laser, a collimator lens for producing a beam of parallel rays of light from said semiconductor laser, and a condensing lens for condensing the parallel rays of light on the object.

Thus, the invention described herein makes possible the objects of (1) providing a micro-displacement measuring apparatus which can readily and accurately measure the micro-displacement of an object in a non-contact manner, using a semiconductor laser, and (2) providing a micro-displacement measuring apparatus which can readily and accurately detect the direction of displacement of the object in a non-contact manner, using a semiconductor laser.

BRIEF DESCRIPTION OF THE DRAWINGS

This invention may be better understood and its numerous objects and advantages will become apparent to those skilled in the art by reference to the accompanying drawings as follows:

FIG. 2(a) shows the displacement of the object with the elapse of time. FIG. 2(b) shows the variation of the optical output of the semiconductor laser. FIG. 2(c) shows the variation of the optical output of the semiconductor laser with the facets of a specific reflectivity and with a specific internal-cavity length.

DESCRIPTION OF THE PREFERRED EMBODIMENTS

Figure 1:
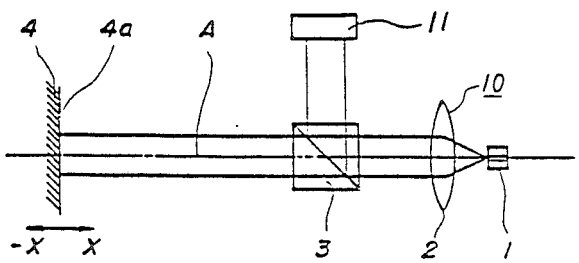
FIG. 1 is a schematic illustration of an apparatus according to this invention.

FIG. 1 shows an apparatus of this invention which comprises a compound resonator system 10 and a light detector 11. The compound resonator system 10 comprises a semiconductor laser 1, a collimator lens 2 for producing a beam of parallel rays of light from the semiconductor laser 1, and a beam splitter 3 for dividing the parallel rays of light into two elements at right angles to each other, one of which is directed to an object 4 to be measured and the other of which is directed to the light detector 11. The semiconductor laser 1, the collimator lens 2, the beam splitter 3 and the object are successively disposed on an optical axis A. The face 4a of the object 4 to be measured is at a right angle to the optical axis A and the light detector 11 is at a right angle to the axis A to receive the light from the beam splitter 3.

A light from the semiconductor laser 1 passes through the collimator lens 2 to produce a beam of parallel rays of light which is then divided into two elements at right angles to each other by means of the beam splitter 3. One of the two elements irradiates the face 4a of the object 4 at a right angle, reflects from the object 4 and returns by the same path to the semiconductor laser 1, resulting in a resonator composed of the face 4a of the object 4 and the light-emitting face of the semiconductor laser 1. The other element of the parallel rays of light from the beam splitter 3 goes to the light detector 11, whereby the optical output of the semiconductor laser 1 is measured.

Figure 2:
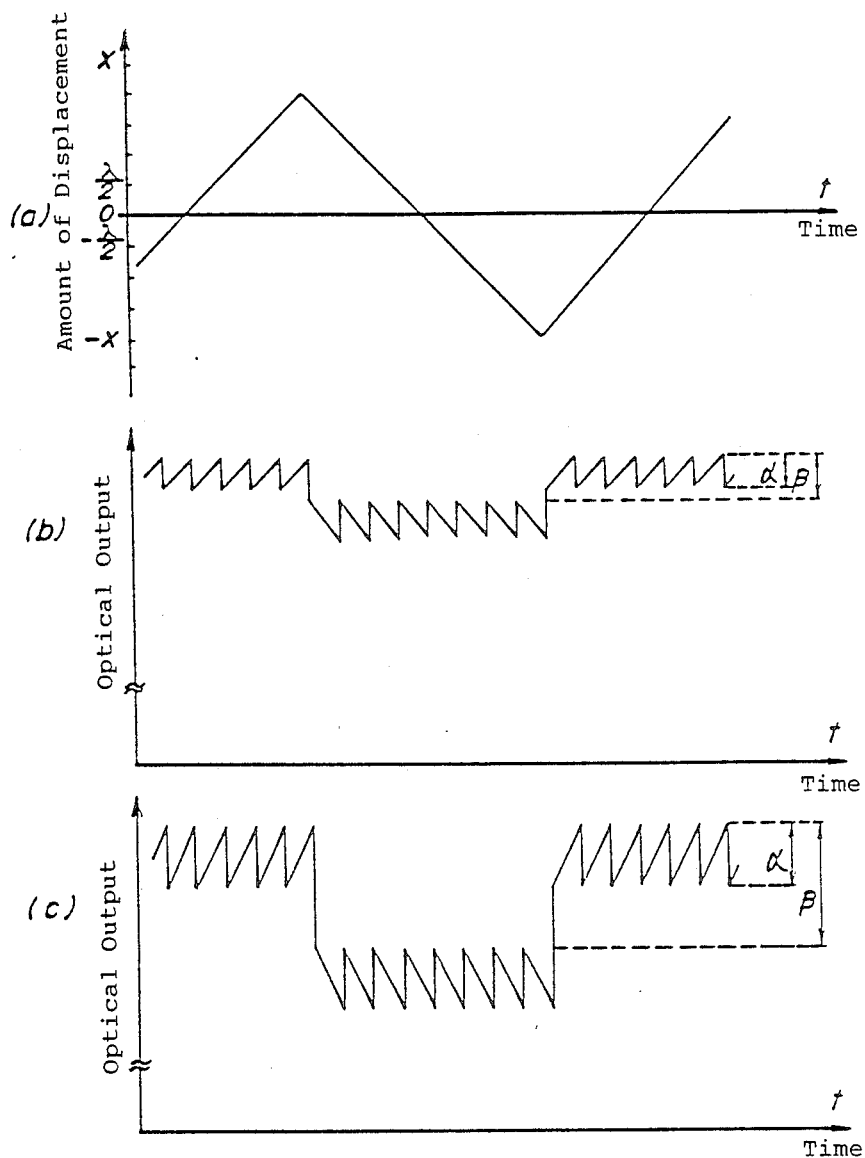
FIG. 2 is an operational illustration showing the relationship between the displacement of the object and the optical output of the semiconductor laser.

In the case in which the intensity of the reflected light is constant at a level, when the object 4 is displaced toward the X or the −X direction in FIG. 1, the optical output of the semiconductor laser 1 varies for each λ/2 (λ: oscillation wavelength) variation in the amount of displacement X based on the phase relationship between the oscillated light from the semiconductor laser 1 and the reflected light from the object 4, resulting in a "fluctuation" of the optical output. The inventors of this invention found that when the direction of displacement of the object 4 is toward the X direction which is closer to the semiconductor laser 1 than the −X direction, the optical output level increases, while when it is toward the −X direction, the optical output level is reduced. For instance, as shown in FIG. 2(a), when the object 4 is displaced ranging from λ in the X direction to λ in the −X direction, the optical output of the semiconductor laser 1 (i.e., the optical input to the light detector 11) varies as shown in FIG. 2(b). This indicates that the amount of displacement for every λ/2 of the object 4 corresponds to the number of fluctuations of the optical input to the light detector 11 in the proportion of 1 to 1, and that the level of the optical output of the semiconductor laser 1 (i.e., the level of the input to the light detector 11) decreases or increases as the displacement of the object 4 is directed toward the semiconductor laser 1 or is in the opposite direction therefrom.

As mentioned above, the amount of displacement and the direction of displacement of the object 4, respectively, corresponds to the variation of the optical output of the semiconductor laser 1. Thus, by detecting the number of fluctuations and the level of the optical output by means of the light detector 11, the amount and the direction of displacement of the object 4 can be realized, respectively. When the displacement of the object 4 is carried out periodically, the amplitude, the number of vibrations or the like thereof can be realized. When the displacement of the object 4 is carried out at right angles to the X direction, the variation of the thickness and the corrugation of the object in the X direction can be computed.

Given that the reflectivity at the front facet of the semiconductor laser 1 which faces the collimator lens 2 is $R_f$ and that at the rear facet thereof which is opposite the collimator lens 2 is Rr, the extent α of fluctuation of the optical output and the difference β in the optical output level between the directions of displacement of the object 4 increase with an increase in the product of $R_f$ and Rr (i.e., $R_f \cdot Rr$) as shown in FIG. 2(c), so that the microdisplacement and the direction of displacement of the object 4 can be measured with an improved accuracy. Both the facets are coated with a double-layered film of dielectrics such as amorphous silicon (a-Si)/Al$_2$O$_3$, etc., or other multi-layered films by electrobeam vapor deposition, a sputtering method, etc., resulting in the desired product of $R_f$ and Rr which is greater than 0.1 but smaller than 1, i.e., $0.1 < R_f \cdot Rr < 1$. A laser light from the rear facet is not employed for the measurement of displacement of the object, and thus the reflectivity at the rear facet, Rr, is preferably set at a high level, which is in the range of approximately 0.7 to 0.95, so as to suppress laser light-emission therefrom. When not only the reflectivity at the rear facet, Rr, but also that at the front facet, $R_f$, are set at a high level, both α and β become great. However, when $R_f$ is at a high level, the intensity of laser light from the front facet is reduced, causing difficulty in the measurement of displacement of the object. Thus, the reflectivity at the front facet, $R_f$, is preferably in the range of approximately 0.5 to 0.7, resulting in the product of $R_f$ and Rr ranging from 0.3 to 0.7. In this Example, when $R_f$ is 0.5 and Rr is 0.95 (i.e., $R_f \cdot Rr = 0.48$), the most preferable measurement of displacement of the object could be carried out. Moreover, it was found that when the semiconductor laser has an internal-cavity length of 250 μm or more, the extent α of the optical output and the difference β in the optical output level between the directions of displacement of the object increase, resulting in an improved measurement accuracy.

In the case in which the object 4 cannot reflect the laser light, a reflecting mirror can be attached to the object 4 to effect the above-mentioned measurements.

Figure 3:
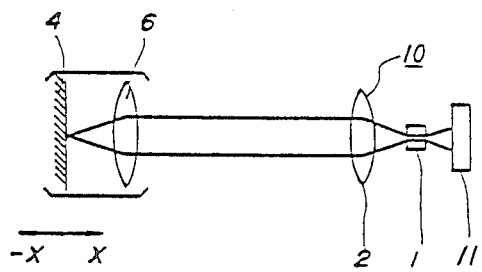
FIG. 3 is a schematic illustration of another apparatus according to this invention.

FIG. 3 shows another apparatus of this invention which comprises a compound resonator system 10 and a light detector 11, as well. The compound resonator system 10 is different from that in FIG. 1 in that a condensing lens 6 instead of the beam splitter 3 is disposed on the optical axis A to condense the parallel rays of light from the collimator lens 2 on the object 4. The light detector 11 is disposed behind the semiconductor laser 1 in a manner to directly receive the laser light therefrom.

The accuracy of the above-mentioned measurements is, of course, improved when the semiconductor laser 1 is operated at a stabilized temperature. So long as the requirements set forth in the attached claims are satisfied, specified materials and structures, specified oscillation wavelengths, etc., are not required for the semiconductor laser 1.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A micro-displacement measuring apparatus using a semiconductor laser, comprises: a compound resonator system containing said semiconductor laser, said compound resonator system being constructed such that a light from said semiconductor laser irradiates an object to be measured and the reflected light therefrom returns to said semiconductor laser, and a light detector for receiving a light from said semiconductor laser, wherein said light detector detects the level of the optical output of said semiconductor laser to determine the direction of displacement of said object, and the relationship between the reflectivity $R_f$ at the front facet of said semiconductor laser from which a laser light irradiates said object, and the reflectivity Rr at the rear facet of said semiconductor laser which is opposite the front facet is as follows:

$$0.1 < R_f \cdot Rr < 1$$

and said light detector includes means to detect both fluctuation of the optical output and level change in the optical output.

2. A micro-displacement measuring apparatus using a semiconductor laser according to claim 1, wherein said semiconductor laser has an internal-cavity length of 250 μm or more.

3. A micro-displacement measuring apparatus using a semiconductor laser according to claim 1, wherein said compound resonator system comprises said semiconductor laser, a collimator lens for producing a beam of parallel rays of light from said semiconductor laser, and a beam splitter for dividing the parallel rays of light into two elements at right angles to each other, one of which is directed to said object and the other of which is directed to said light detector.

4. A micro-displacement measuring apparatus using a semiconductor laser according to claim 1, wherein said compound resonator system comprises said semiconductor laser, a collimator lens for producing a beam of parallel rays of light from said semiconductor laser, and a condensing lens for condensing the parallel rays of light on the object.

* * * * *